Oct. 22, 1963 R. M. TUCK 3,107,553
TRANSMISSION
Filed July 18, 1960
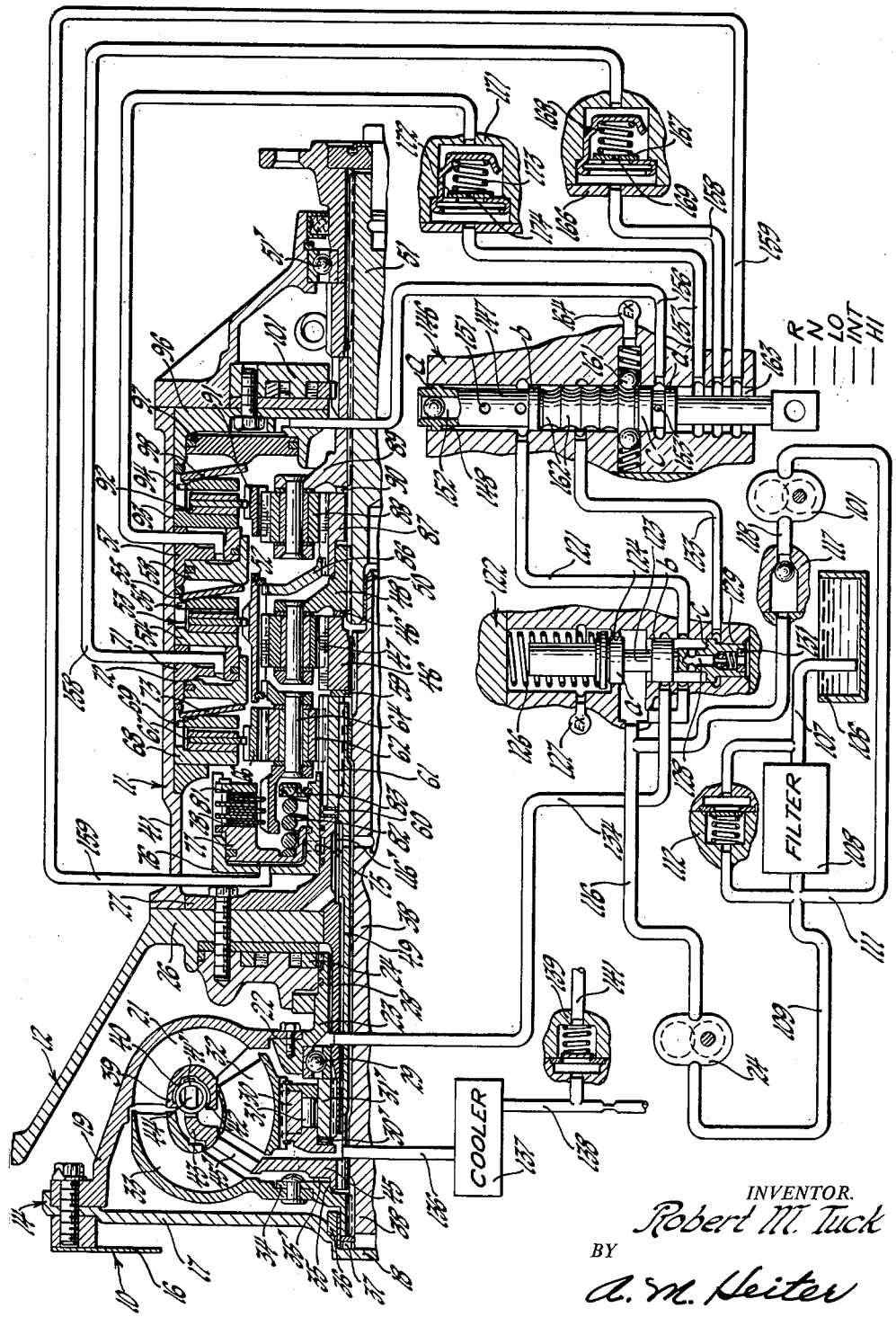
INVENTOR.
Robert M. Tuck
BY
A. M. Heiter
ATTORNEY

| United States Patent Office | 3,107,553 |
|---|---|
| | Patented Oct. 22, 1963 |

3,107,553
TRANSMISSION
Robert M. Tuck, Indianapolis, Ind., assignor to General Motors Corporation, Detroit, Mich., a corporation of Delaware
Filed July 18, 1960, Ser. No. 43,395
14 Claims. (Cl. 74—688)

This invention relates to a transmission, particularly a torque converter and multiratio gear unit transmission providing torque converter drives and split torque drives.

The transmission employs a torque converter and a three forward speed and reverse gear unit combined to provide torque converter and reduction gear ratio series drive in low and reverse, a split torque intermediate drive providing torque multiplication in both the torque converter and gear unit and a split torque drive in high ratio providing torque multiplication in the torque converter and direct drive in the gear unit. The torque converter includes a pump which is driven by the input shaft, a turbine driven by the pump and connected to the torque converter output shaft and a stator to provide torque multiplication. A vibration damper is located in the eye of the torque converter and connects the input through the pump member to drive a sleeve input shaft surrounding the torque converter output shaft. The torque converter output shaft drives the sun gear of a first planetary gear set having a carrier connected to the output shaft and a ring gear which is retarded for torque converter drive through the speed reducing ratio of the first gear set in low ratio. The input sleeve shaft drives the sun gear of the second planetary gear set which has a carrier connected to the ring gear of the first gear set and a ring gear. The ring gear of the second gear set is retarded in intermediate ratio to provide a direct mechanical input drive through the second gear set to drive the ring gear of the first gear set at a reduced speed while the torque converter turbine drives the sun gear of the first gear set which acts as a torque combining gear set. This intermediate drive therefore combines a reduced speed or torque multiplied mechanical drive with the torque converter drive. In high ratio the input sleeve shaft is connected by a clutch to the carrier which drives the ring gear of the first or torque combining gear set at input speed. The converter also drives the sun gear of the torque combining gear set to provide a split torque drive including a torque multiplying drive through the torque converter and a direct mechanical drive from the input to the ring gear of the torque combining gear set. The reverse gear set has a sun gear connected to the ring gear of the first gear set and a carrier connected to the output shaft and a ring gear to provide reverse torque converter and reduction gear drive when the reverse ring gear is held.

This arrangement provides a reduction gear ratio and torque converter drive in low ratio to obtain full torque multiplication without direct mechanical drive. In intermediate ratio the torque converter drive is combined with a reduction gear drive or mechanical torque multiplying drive to provide an intermediate split torque ratio. In high ratio the torque converter drive is combined with the direct mechanical drive to provide increased proportion mechanical drive in the split torque drive.

An object of the invention is to provide in a transmission employing a torque converter and a multiratio gear unit arranged to provide in low ratio a torque converter and high torque multiplication gear drive combined in series in intermediate ratio, a torque converter drive and a mechanical drive through a torque multiplying gear ratio combined in parallel and in high ratio a torque converter drive and a direct mechanical drive combined in parallel.

Another object of the invention is to provide in a torque converter and multiratio gear drive a torque converter unit having an output shaft and an input driven sleeve shaft immediately surrounding the output shaft, a multiratio gear unit and a torque combining planetary gear set having a sun gear driven by the torque converter output shaft, a carrier connected to the transmission output shaft and a ring gear which is held for low ratio driven from the input sleeve shaft through a reduction gear set in intermediate ratio and driven directly from the input sleeve shaft in high ratio.

Another object of the invention is to provide in a transmission having a torque converter including a pump, turbine, turbine output shaft and stator, and a three-speed forward gear unit, an improved and simplified construction including a mechanical drive output shaft immediately surrounding the turbine output shaft with the torque converter output shaft driving the sun gear of the torque combining planetary gear set having its carrier connected to the output shaft and the input sleeve shaft driving the sun gear of a torque multiplying planetary gear set having its carrier connected to the ring gear of the torque combining gear set and a clutch connecting the input sleeve shaft to the carrier of the torque multiplying gear set.

These and other objects of the invention will be more apparent from the following description and drawing of the preferred embodiment of the invention.

The drawing shows a sectional view of the transmission drive structure and a schematic diagram of the hydraulic control system.

This invention is illustrated in a transmission having a torque converter unit 10 and a multiratio gear unit 11. The torque converter unit 10 is located in the torque converter portion 12 of the transmission housing and has a rotary torque converter housing 14 which is driven by the engine through the input drive plate 16 connected to the engine shaft. The torque converter housing 14 has a forward wall 17 having a hub portion 18 which is rotatably supported or piloted in a conventional manner, not shown, in the engine output shaft. The torque converter housing 14 also includes a pump portion 19 integrally including the torque converter pump 21 which consists of a plurality of blades. The housing 19 has a hub portion 22 secured to drive sleeve 23 which drives the pump 24 to provide fluid under pressure for the control system. The pump 24 is mounted on the rear wall 26 of the fixed torque converter housing 12.

The plate member 27 secured to wall 26 has integrally formed or attached thereto a ground sleeve or stationary sleeve 28 which extends forwardly through the drive sleeve 23 to support a bearing 29 which rotatably supports the sleeve 23 and the rear hub 22. The inner race 31' of one-way brake 31 on which the stator assembly 32 is mounted is also splined to sleeve 28. The outer race 30 of one-way brake 31 has a shoulder contacting thrust bearing 30' which engages the inner race 31'. Since fluid flow in the converter only creates thrust in one direction, this single thrust bearing is sufficient. The torque converter turbine 33 has a plurality of turbine blades and is connected to a hub 34 which is rotatably supported by a bearing 36 and axially located by thrust bearing 37 on the forward wall 17 and splined to the torque converter output shaft 38. The rear end of output shaft 38 is rotatably supported by a bearing in the bore of output shaft 51.

The pump member 19 has an inner annular wall 39 supported by the blades of the torque converter pump 21. The wall 39 is C-shaped in cross-section and with similar annular walls of the turbine and stator members forms the eye of the torque converter. The inner cavity of the C-shaped wall 39 is formed to provide pockets or interior recesses 40 to receive a plurality of pairs of springs 41'. The C-shaped recess 40 has lips 42 at the outer edge to hold the springs 41' in position within the recess 40 in C-shaped member 39. The annular drive member 43 has a tongue 44 extending between each pair of springs 41' to provide a vibration damper connection. The ring 43 is connected to a hub 45 splined to the mechanical drive sleeve shaft 49 by a plurality of streamlined spokes 45' positioned at an angle equivalent to the normal flow past the spokes so that they provide minimum interference with the flow of fluid through the torque converter. The forward end of sleeve shaft 49 and hub 45 is rotatably mounted on hub 34 by bearing 35, and axially located by thrust bearing 35'.

The multiratio gear unit 11, located in fixed housing portion 21, has a first or torque combining gear set and a second or torque multiplying gear set and a reverse gear set. The torque converter output shaft 38 is suitably splined to the sun gear 46 which meshes with the pinions 47 mounted on a carrier 48 which is suitably splined to the output shaft 51. Carrier 48 and sun gear 46 are located by thrust bearing 46'. The output shaft 51 is rotatably supported and axially located by bearing 51'. The torque combining gear set has a ring gear 52 connected by suitable splines to the rotating plate of the brake 53. The plate of brake 53 is located between a fixed abutment 54 and a movable abutment 56. The brake is actuated by a fluid motor consisting of an annular internal-external cylinder 57 and an L-shaped piston 58 which transmits force through the Belleville spring 55 to the movable abutment 56. The piston 58 engages the Belleville spring at their inner diameters. The Belleville spring contacts the movable abutment 56 at an intermediate circumference and is pivoted at its outer circumference on the fixed housing 41.

In the transmission unit 11 the mechanical drive sleeve shaft 49 is connected to drive the sun gear 61 of the torque multiplying planetary gear set. The sun gear 61 is axially located by a thrust bearing 60 abutting the rear end of ground sleeve 28 and a thrust bearing 59' abutting sun gear 46. The sun gear 61 meshes with the planetary pinions 62 on the carrier 64 which is connected to the ring gear 52 of the torque combining gear set. The pinions 62 also mesh with the ring gear 66 which is suitably splined to a brake plate 67 located between fixed abutment 68 and a movable abutment 69. The intermediate brake is actuated by a fluid motor consisting of the annular internal-external cylinder 71 and piston 72 which through a similar Belleville spring lever 73 actuates the intermediate brake.

The direct drive clutch has an annular channel shaped housing member 76 suitably splined to a portion of the sun gear 61 driven by mechanical input shaft 49. The housing 76 provides an annular cylinder for the piston 77 which is moved by hydraulic fluid to engage the clutch plates 78 between the piston 77 and the fixed abutment 81 secured to the housing 76. Intermediate plates of the clutch are splined to the housing 76 and alternate plates are splined to an extension of carrier 64. The clutch is disengaged by coil spring 82 which engages the piston and an abutment 83 fixed to the housing 76.

The ring gear 52 is connected by a suitable driving disc 86 to the sun gear 87 of the reverse gear set. The sun gear 87 meshes with the pinions 88 on the reverse carrier 89 which is suitably splined to the output shaft 51. Sun gear 87 and carrier 89 are spaced by thrust bearing 90. The reverse ring gear 91 meshes with the pinions 88 and is splined to the reverse brake plate 92 which is located between fixed abutment 93 and the movable abutment 94. The reverse brake is applied by a fluid motor including a cylinder 96 fixed to the housing 41 and a piston 97 located in this housing. The annular piston 97 has an annular abutment engaging the Belleville spring lever 98 which is pivoted at its outer edge to the housing and actuates the movable abutment 94 at an intermediate point.

The rear pump 101 is suitably mounted in the rear wall of the transmission housing 41 and driven by the output shaft 51.

When each of the first torque combining and the second torque multiplying planetary gear sets employed in this transmission have a 3:1 ratio (the diameter of the ring gear is twice the diameter of the sun gear) the division of input torque to the gear set through shafts 49 and 38 is fixed at 40% mechanical on shaft 49 and 60% hydraulic on shaft 38 in intermediate range and 66⅔% mechanical on shaft 49 and 33⅓% hydraulic on shaft 38 in high range. In low range the drive is 100% hydraulic as the direct clutch and intermediate brake connected to the second multiplying planetary set are disengaged releasing the mechanical drive. Thus, the effectiveness of the torque converter for all purposes, for example torque multiplication and torque transmission, is greatest in low range where maximum multiplication is needed and diminishes with each increase of gear range to a minimum in high range where maximum efficiency is needed.

*Hydraulic Controls*

The hydraulic control system is supplied with fluid such as oil collected in the sump 106 located in the lower portion of transmission housing and preferably the multiratio gear unit housing 41. Fluid is pumped through intake line 107 and filter 108 to the front pump intake line 109 and the rear pump intake line 111. The filter 108 has a relief bypass 112 consisting of a bypass line and relief valve. When cold oil or dirt blocks passage through the filter, oil is supplied through the bypass 112. The intake line 109 is connected to the front pump 24 which supplies fluid to the front pump line 116 and the rear pump intake line 111 is connected to the rear pump 101 which supplies fluid through the one-way or check valve 117 to the rear pump supply line 118. The front and rear pump supply lines 116 and 118 combine to form the main line 121 at the regulator valve 122.

The regulator valve 122 has a valve element 123 having lands *a*, *b* and *c* of equal diameter located in a bore 124. The spring 126 normally biases the valve element 123 to the position shown in the drawing wherein land *a* blocks flow from main line 121 to exhaust 127. The space between lands *b* and *c* is always connected to main line 121 and connects the main line 121 through the valve. The main line pressure is also connected through the check valve passage 128 to the closed chamber at the end of the reduced bore portion 129 where the fluid acts on the reduced end 131 of the valve element to provide a pressure equal to main line pressure opposing the biasing force of the valve. The check valve and check valve passage 128 has an orifice through the movable valve element so that a reduced volume of return flow is permitted. Thus the fluid may flow rapidly to the space at the end of the valve but return flow is retarded to dampen the valve regulating action. When the line pressure increases to the predetermined regulated value the pressure acting on the reduced valve end 129 and valve element 123 moves to the open position against the biasing force permitting fluid to exhaust from line 121 past land *a* to exhaust 127. The signal line 133 is supplied with fluid under pressure at the manual valve in intermediate ratio positions and acts on the unbalanced area between the land *c* and the reduced portion 129 of regulator valve element 123 to assist the fluid forces acting on the valve to reduce main line pressure to a lower predetermined value. The regulator valve 122 first regulates pressure to the main line 121 then regulates pressure to both the main line 121 and the converter supply line 134 at the same pressure. Further pressure rise is limited by the exhaust from line 121 past land *a* to exhaust 127.

The converter supply line 134 is connected through bearing 29 to enter the torque converter operating chamber at the space between the stator and the pump. The fluid is exhausted from the torque converter operating chamber at the space between the hub 45 and the stator to the converter outlet line 136 which is connected through the cooler 137 to the lubrication line 138. The pressure in the lubrication line 138 is regulated by the relief valve 139 which exhausts the excess fluid to the sump via line 141.

The manual valve 146 is employed to select the drive ratios and consists of a valve element 147 having lands a, b, c and d of equal diameter located in a bore 148. The main line 121 is connected in all valve positions to the valve bore 148 between the lands a and b. Fluid is thus connected through apertures 151 to blind bore 152 extending through the valve and through the aperture 153 to the space between the lands c and d. Fluid is supplied to the main line through the valve to the space between the lands c and d and is connected to the reverse line 156 in the reverse position shown, is blocked in the neutral valve position, is connected to the low line 157 in the low valve position, is connected to the intermediate line 158 in the intermediate position and is connected to the high line 159 in the high position. A spring mounted detent 161 cooperates with a groove 162 on the valve element 147 in each valve position to locate the valve in each position. All of the ratio lines between the land d and exhaust 163 at the end of the valve body are connected to the exhaust at 163 and all ratio lines between the land b and the land c are connected to exhaust 164. The main line 121 is directly connected between the lands a and b to the signal line 133 in intermediate and high positions of the valve element.

The reverse line 156 is connected directly to the reverse motor cylinder 96. The high line 159 is connected directly to the high motor cylinder member 76. Line 159 is actually connected by a bore in the fixed housing to the transfer bushing 75 in the rear end of ground sleeve 28. The intermediate line 158 is connected through the check valve 166 which provides full flow to the intermediate cylinder 71 of the intermediate motor and restricted return flow to exhaust to slow the disengagement of the intermediate motor. The check valve 166 has a closure plate 167 biased to a closed position by spring 168. On flow to the motor the closure plate 167 is opened by the fluid under pressure to provide full flow through the valve. During disengagement of intermediate ratio the return flow permits the spring 168 to close the valve and a restricted flow is provided through the orifice 169 in the valve closure 167. The valve 171 in the low line 157 similarly permits fast fill and retarded release of the fluid supply to the low motor.

The check valve 171 similarly consists of a closure member 172 biased to a closed position by a light spring 173 which has an orifice 174 to permit restricted return of flow.

The front pump 24 supplies fluid when the vehicle engine is operating and the rear pump 161 supplies fluid when the vehicle is moving or the output shaft is rotating under pressure to the regulator valve 122. The regulator valve 122 first supplies fluid at the regulated pressure through main line 121 and then to the converter inlet line 134 at the same regulated pressure. The regulated pressure is at a normal value in reverse, neutral and low and at a reduced value at intermediate and high. When the manual valve 146 is in the reverse position shown, the main line is connected to the reverse line 156 to actuate the reverse motor and brake 92 to hold the reverse ring gear 91. When the manual valve is in the neutral position flow through the valve is blocked and all lines are connected to exhaust. When the manual valve is in the low position main line 121 is connected to low line 157 which provides free flow through the check valve 171 to the low motor cylinder 57 to actuate low brake 53 to retard ring gear 52. On movement from the low position the exhaust through valve 171 is restricted to hold the low motor engaged for a limited time to prevent engine over-run. When the manual valve is moved to the intermediate position main line 121 is connected to intermediate line 158 which flows freely through the check valve 166 to the intermediate motor cylinder 71 to engage the intermediate brake 67 to hold the ring gear 66. When the manual valve is moved to the high position main line 121 is connected to the high line 159 which is freely connected to the high clutch motor cylinder 76. If low or intermediate were previously engaged, these drives will be slowly disengaged.

The above described preferred embodiment is illustrative of the invention which it will be appreciated may be modified within the scope of the appended claims.

I claim:

1. In a transmission; an input member; a torque converter having a pump, a turbine, a stator, and a turbine output member, said pump being driven by said input member, said turbine being connected to drive said turbine output member and said stator being mounted to prevent reverse rotation and to provide variable torque multiplying fluid drive between said pump and said turbine; a transmission output member; planetary gear means having a first input element, a second input element and an output element connected to said output member for driving said output member when one input is driving and the other is held and when both input members are driving; said turbine output member being connected to drive said first input element to provide converter drive; torque multiplying means connecting said input member to said second input element operative to provide, in a first condition, a high torque multiplying drive for providing a drive to said output element having a high proportion of converter drive and a low proportion of mechanical dive and in a second condition a lower torque multiplying drive for providing a drive to said output element having a low proportion of converter drive and a high proportion of mechanical drive.

2. The invention defined in claim 1 and said torque multiplying means having means to disconnect said torque multiplying means and additional means to hold said second input element to provide full converter drive.

3. In a transmission; an input member; a torque converter having a pump, a turbine, a stator, and a turbine output member, said pump being driven by said input member, said turbine being connected to drive said turbine output member and said stator being mounted to prevent reverse rotation and to provide variable torque multiplying fluid drive between said pump and said turbine; a transmission output member, planetary gear means having a first input element, a second input element and an output element connected to said output member for driving said output member when one input is driving and the other is held and when both input members are driving; first drive means connecting said turbine output member to said first input element to provide a first drive to said first input element, second drive means connecting said input member to said second input element to provide a second drive to said second input element; one of said drive means including torque multiplying means for providing in a first condition a high torque multiplying drive providing a drive from said output element having a proportion of said first and second drives to said output element, and in a second condition a low torque multiplying drive providing a drive from said output element having another proportion of said first and second drives to said output element.

4. In a transmission, a torque converter, an input member, an output member, an intermediate shaft, a torque converter having a pump, turbine and stator, said pump being driven by said input member, said turbine driving said intermediate shaft, means mechanically connecting said pump member to an input drive sleeve shaft surrounding said intermediate shaft, a first planetary gear set having a sun gear member a ring gear member and a carrier member having planetary pinions meshing with said sun and ring gear members, said carrier member being connected to said output member, said intermediate shaft being connected to said sun gear member, means to hold said ring gear to provide low ratio, a second planetary gear set having a sun gear member and a ring gear member and a carrier member having planetary pinions meshing with said sun and said ring gear members, said input drive sleeve shaft being connected to said sun gear of said second gear set, said carrier member of said second gear set being connected to said ring gear of said first gear set, means to retard said ring gear of said second gear set to provide intermediate ratio, and means connecting two members of said second gear set to lock up said second gear set to provide high ratio.

5. In a transmission, a torque converter, an input member, an output member, an intermediate shaft, a torque converter having a pump, turbine, and stator, said pump being driven by said input member, said turbine driving said intermediate shaft, means mechanically connecting said pump member between said turbine and stator members to an input drive sleeve shaft surrounding said intermediate shaft, a first planetary gear set having a sun gear member a ring gear member and a carrier member having planetary pinions meshing with said sun and ring gear members, one member of said first gear set being connected to said output member, said intermediate shaft being connected to another member of said first gear set, means to hold the third member of said first gear set to provide low ratio, a second planetary gear set having a sun gear member and a ring gear member and a carrier member having planetary pinions meshing with said sun and said ring gear members, said input drive sleeve shaft being connected to one member of said second gear set, another member of said second gear set being connected to said third member of said first gear set, means to retard the third member of said second gear to provide intermediate ratio, and means connecting said input drive sleeve shaft to said another member of said second gear set to provide high ratio.

6. In a transmission, a torque converter, an input member, an output member, an intermediate shaft, a torque converter having a pump, turbine, and stator, said pump being driven by said input member, said turbine driving said intermediate shaft, means mechanically connecting said pump member between said turbine and stator members to an input drive sleeve shaft surrounding said intermediate shaft, a first planetary gear set having a sun gear member a ring gear member and a carrier member having planetary pinions meshing with said sun and ring gear members, said carrier member being connected to said output member, said intermediate shaft being connected to said sun gear member, means to hold said ring gear to provide low ratio, a second planetary gear set having a sun gear member and a ring gear member and a carrier member having planetary pinions meshing with said sun and said ring gear members, said input drive sleeve shaft being connected to said sun gear of said second gear set, said carrier member of said second gear set being connected to said ring gear of said first gear set, means to retard said ring gear of said second gear set to provide intermediate ratio, and means connecting said input drive sleeve shaft to said carrier of said second gear set to provide high ratio.

7. The invention defined in claim 6 and said planetary gear sets having substantially the same ratio to provide a substantially inverse split of torque converter torque and mechanical torque in intermediate and high ratios delivered to the gear sets by said intermediate shaft and input drive sleeve shaft.

8. The invention defined in claim 6 and said planetary gear sets having gear ratios to provide a torque split providing a high proportion of torque transmitted by the torque converter in intermediate ratio and a low proportion of torque transmitted by the torque converter in high ratio.

9. In a transmission, a torque converter, an input member, an output member, an intermediate shaft, a torque converter having a pump, turbine, and stator, said pump being driven by said input member, said turbine driving said intermediate shaft, means mechanically connecting said pump member between said turbine and stator members to an input drive sleeve shaft surrounding said intermediate shaft, a first planetary gear set having a sun gear member a ring gear member and a carrier member having planetary pinions meshing with said sun and ring gear members, said carrier member being connected to said output member, said intermediate shaft being connected to said sun gear member, means to hold said ring gear to provide low ratio, a second planetary gear set having a sun gear member and a ring gear member and a carrier member having planetary pinions meshing with said sun and said ring gear members, said input drive sleeve shaft being connected to said sun gear of said second gear set, said carrier member of said second gear set being connected to said ring gear of said first gear set, means to retard said ring gear of said second gear to provide intermediate ratio, means connecting said input drive sleeve shaft to said carrier of said second gear set to provide high ratio, a reverse planetary gear set having a sun gear member connected to said ring gear of said first gear set, a ring gear member and a carrier having planetary pinions meshing with said sun and ring gear members, said carrier of said reverse gear set being connected to said output member, and means to hold said ring gear member of said reverse gear set to provide reverse.

10. In a transmission, a torque converter, an input member, an output member, an intermediate shaft, a torque converter having a pump, turbine, and stator, said pump being driven by said input member, said turbine driving said intermediate shaft, means mechanically connecting said pump member between said turbine and stator members to an input drive sleeve shaft surrounding said intermediate shaft, a first planetary gear set having a sun gear member a ring gear member and a carrier member having a planetary pinions meshing with said sun and ring gear members, said carrier member being connected to said output member, said intermediate shaft being connected to said sun gear member, means quickly operable to engage to hold said ring gear to provide low ratio and slowly operable to disengage low ratio, a second planetary gear set having a sun gear member and a ring gear member and a carrier member having planetary pinions meshing with said sun and said ring gear members, said input drive sleeve shaft being connected to said sun gear of said second gear set, said carrier member of said second gear set being connected to said ring gear of said first gear set, means quickly operable to engage to retard said ring gear of said second gear to provide intermediate ratio and slowly operable to disengage, and means quickly operable to connect said input drive sleeve shaft to said carrier of said second gear set to provide high ratio and to disconnect said input drive sleeve shaft from said carrier.

11. In a transmission, a torque converter, an input member, an output member, an intermediate shaft, a torque converter having a pump, turbine, and stator, said pump being driven by said input member, said turbine driving said intermediate shaft, means mechanically connecting said pump member between said turbine and stator members to an input drive sleeve shaft surrounding and rotatably supported on said intermediate shaft, a fixed ground sleeve surrounding said input drive sleeve shaft and rotatably supporting said stator and pump, a first planetary gear set having a sun gear member a ring gear member and a carrier member having planetary pinions meshing with said sun and ring gear members, said carrier member being connected to said output member, said intermediate shaft being connected to said sun gear member, means to hold said ring gear to provide low ratio, a second planetary gear set having a sun gear member and a ring gear member and a carrier member having planetary pinions meshing with said sun and said ring gear members, said input drive sleeve shaft being connected to said sun gear of said second gear set, said carrier member of said second gear set being connected to said ring gear of said first gear set, means to retard said ring gear of said second gear to provide intermediate ratio, and means connecting said input drive sleeve shaft to said carrier of said second gear set to provide high ratio.

12. In a transmission, a torque converter, an input member, an output member, an intermediate shaft, a torque converter having a pump, turbine, and stator, said pump being driven by said input member, said turbine driving said intermediate shaft, means mechanically connecting said pump member between said turbine and stator members to an input drive sleeve shaft surrounding and rotatably supported on said intermediate shaft, a first planetary gear set having a sun gear member a ring gear member and a carrier member having planetary pinions meshing with said sun and ring gear members, said carrier member being connected to said output member, said intermediate shaft being connected to said sun gear member, means to hold said ring gear to provide low ratio, a second planetary gear set having a sun gear member and a ring gear member and a carrier member having planetary pinions meshing with said sun and said ring gear members, said input drive sleeve shaft being connected to said sun gear of said second gear set, said carrier member of said second gear set being connected to said ring gear of said first gear set, means to retard said ring gear of said second gear to provide intermediate ratio, clutch means including a housing splined to said sleeve shaft connecting said input drive sleeve shaft to said carrier of said second gear set to provide high ratio, and a ground sleeve surrounding said input drive sleeve shaft and externally supporting said stator and pump and providing a fluid transfer bushing to said clutch housing.

13. In a transmission, a torque converter, an input member, an output member, an intermediate shaft rotatably supported on said input and output members, an input drive sleeve shaft surrounding and rotatably supported on said intermediate shaft, a torque converter having a pump, turbine, and stator, said pump being driven by said input member, said turbine driving said intermediate shaft, means mechanically connecting said pump member between said turbine and stator members to said input drive sleeve shaft, a first planetary gear set having a sun gear member, a ring gear member and a carrier member having planetary pinions meshing with said sun and ring gear members, said carrier member being connected to said output member, said intermediate shaft being connected to said sun gear member, means to hold said ring gear to provide low ratio, a second planetary gear set having a sun gear member and a ring gear member and a carrier member having planetary pinions meshing with said sun and said ring gear members, said input drive sleeve shaft being connected to said sun gear of said second gear set, said carrier member of said second gear set being connected to said ring gear of said first gear set, means to retard said ring gear of said second gear to provide intermediate ratio, clutch means including a housing splined to said sleeve shaft connecting said input drive sleeve shaft to said carrier of said second gear set to provide high ratio, and a ground sleeve surrounding said input drive sleeve shaft and externally supporting said stator and pump.

14. In a transmission, a torque converter, an input member, an output member, an intermediate shaft, an input drive sleeve shaft surrounding said intermediate shaft, a torque converter having a pump, turbine rotatably supported on said input member, and stator, said pump being driven by said input member, said turbine driving and rotatably supporting the forward end of said intermediate shaft, hub means mechanically connecting said pump member between said turbine and stator members to said input drive sleeve shaft and rotatably supporting said hub means and sleeve shaft, on said turbine, a first planetary gear set having a sun gear member, a ring gear member and a carrier member having planetary pinions meshing with said sun and ring gear members, said carrier member being connected to said output member, said intermediate shaft being connected to said sun gear member, means to hold said ring gear to provide low ratio, a secondary planetary gear set having a sun gear member and a ring gear member and a carrier member having planetary pinions meshing with said sun and said ring gear members, said input drive sleeve shaft being connected to said sun gear of said second gear set, said carrier member of said second gear set being connected to said ring gear of said first gear set, means to retard said ring gear of said second gear to provide intermediate ratio, clutch means including a housing splined to said sleeve shaft connecting said input drive sleeve shaft to said carrier of said second gear set to provide high ratio, and a ground sleeve surrounding said input drive sleeve shaft and externally supporting said stator and pump.

References Cited in the file of this patent

UNITED STATES PATENTS

| | | |
|---|---|---|
| 2,519,022 | Burtnett | Aug. 15, 1950 |
| 2,736,215 | Swift | Feb. 28, 1956 |
| 2,919,606 | Karlsson et al. | Jan. 5, 1960 |
| 3,030,824 | Moore | Apr. 24, 1962 |